(12) United States Patent
Kim et al.

(10) Patent No.: US 6,289,110 B1
(45) Date of Patent: Sep. 11, 2001

(54) OBJECT EXTRACTING METHOD USING MOTION PICTURE

(75) Inventors: Hyeon-June Kim, Sungnam; Jin-Soo Lee, Seoul, both of (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/157,948

(22) Filed: Sep. 22, 1998

(30) Foreign Application Priority Data

Oct. 29, 1997 (KR) ................................................ 97-55956

(51) Int. Cl.⁷ ..................................................... G06K 9/00
(52) U.S. Cl. ........................................... 382/103; 348/169
(58) Field of Search ..................................... 382/103, 164, 382/174, 199, 195, 291, 203; 348/169

(56) References Cited

U.S. PATENT DOCUMENTS

| | | | |
|---|---|---|---|
| 5,748,776 | * 5/1998 | Yoshida | 382/195 |
| 5,835,641 | * 11/1998 | Sotoda et al. | 382/291 |
| 5,912,980 | * 6/1999 | Hunke | 382/103 |
| 5,974,175 | * 10/1999 | Suzuki | 382/199 |
| 6,028,960 | * 2/2000 | Graf et al. | 382/203 |

* cited by examiner

*Primary Examiner*—Joseph Mancuso
*Assistant Examiner*—Abolfazl Tabatabai
(74) *Attorney, Agent, or Firm*—Fleshner & Kim, LLP (57) ABSTRACT

An object extracting method using a motion picture more accurately and rapidly extracts a specific object by using a difference image frame of a pair of still image frames obtained from a motion picture and color information which defines a color of the object. The object extracting method using a motion picture includes the steps of: obtaining a difference image frame by getting a pair of still image frames having a predetermined time interval from a motion picture and obtaining a color image frame which satisfies color information defining a color of a particular object from one of the still image frames; performing a grid processing of a logic image frame which is obtained from the difference image frame and the color image frame at a predetermined size and obtaining connected components using direction connection information and defining minimum areas each includes the connected components; comparing each of the minimum areas with predetermined conditions, thereby selecting the minimum areas which satisfy the conditions as object area candidates; and selecting and optimizing a largest object area candidate among the object area candidates.

20 Claims, 6 Drawing Sheets

OBJECT EXTRACTING METHOD USING MOTION PICTURE

BACKGROUND OF THE INVENTION

1. Field of the Invention

The present invention relates to a technique of extracting a specific object in a motion picture, and more particularly to an object extracting method using motion pictures which more accurately and rapidly extracts an object using information of a moving object in a motion picture and color information which defines a color of the object.

2. Description of the Conventional Art

A motion picture is composed of image frames, each frame carries information with respect to an object. Recently, a conventional technique which extracts a specific object using the motion picture can be divided into two ways; one is to extract the object using only color information which defines a color thereof and the other is to extract the object using information of motion changes of the object.

First, the conventional object extracting method using the color information will be explained.

After obtaining a still image frame from a motion picture, a preprocessing step is performed, which generates a color histogram by converting a negative image of the still image frame to a positive image.

Next, red, green and blue (RGB) color domains included in the histogram are converted to hue saturation values (HSV), and color information of the object such as skin-color pixels are obtained. To the color pixels, segmentation occurs through edge detection, hole filtering and gap filtering. Finally, the segments and a predetermined object domain are compared, thus the specific object is extracted.

However, because the conventional object extracting method using only the color information obtains one still image frame using the color information which defines the color of the object and thus extracts the object therefrom, the object may not be accurately obtained. Accordingly, the above object extracting method using the color information requires a considerable operation time to extract the object because RGB color space is converted to HSV color space with respect to the inaccurate object domain.

A face-it method which is the other object extracting method extracts a specific object only using motion information of the object on a motion picture, without using color information thereof. Particularly, the face-it method which extracts a human face designates an area in which there is a movement of a specific object as a face domain candidate and carries out a grey image process for the domain candidate, thereby obtaining information with respect to the corresponding human face. Accordingly, the face-it which extracts the human face with insufficient information has difficulty of accurately extracting a human face.

SUMMARY OF THE INVENTION

Accordingly, an object of the present invention is to provide an object extracting method using a motion picture which accurately and rapidly extracts an object using information of a moving object in a motion picture and color information which define a color of the object.

To achieve these and other advantages and in accordance with the purpose of the present invention, as embodied and broadly described, an object extracting method includes the steps of: obtaining a difference image frame by getting a pair of still image frames having a predetermined time difference from a motion picture and obtaining a color image frame which satisfies color information defining a color of a particular object from one of the still image frames; performing a grid processing of a logic image frame which is obtained from the difference image frame and the color image frame at a predetermined size and obtaining connected components using direction connection information and defining minimum areas each includes the connected components; comparing each of the minimum areas with predetermined conditions, thereby selecting the minimum areas which satisfy the conditions as object area candidates; and selecting and optimizing a largest object area candidate among the object area candidates.

It is to be understood that both the foregoing general description and the following detailed description are exemplary and explanatory and are intended to provide and further explanation of the invention as claimed.

DETAILED DESCRIPTION OF THE INVENTION

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Now, the object extracting method using a motion picture according to the present invention will be described in detail with reference to the accompanying drawings.

Figure 1:
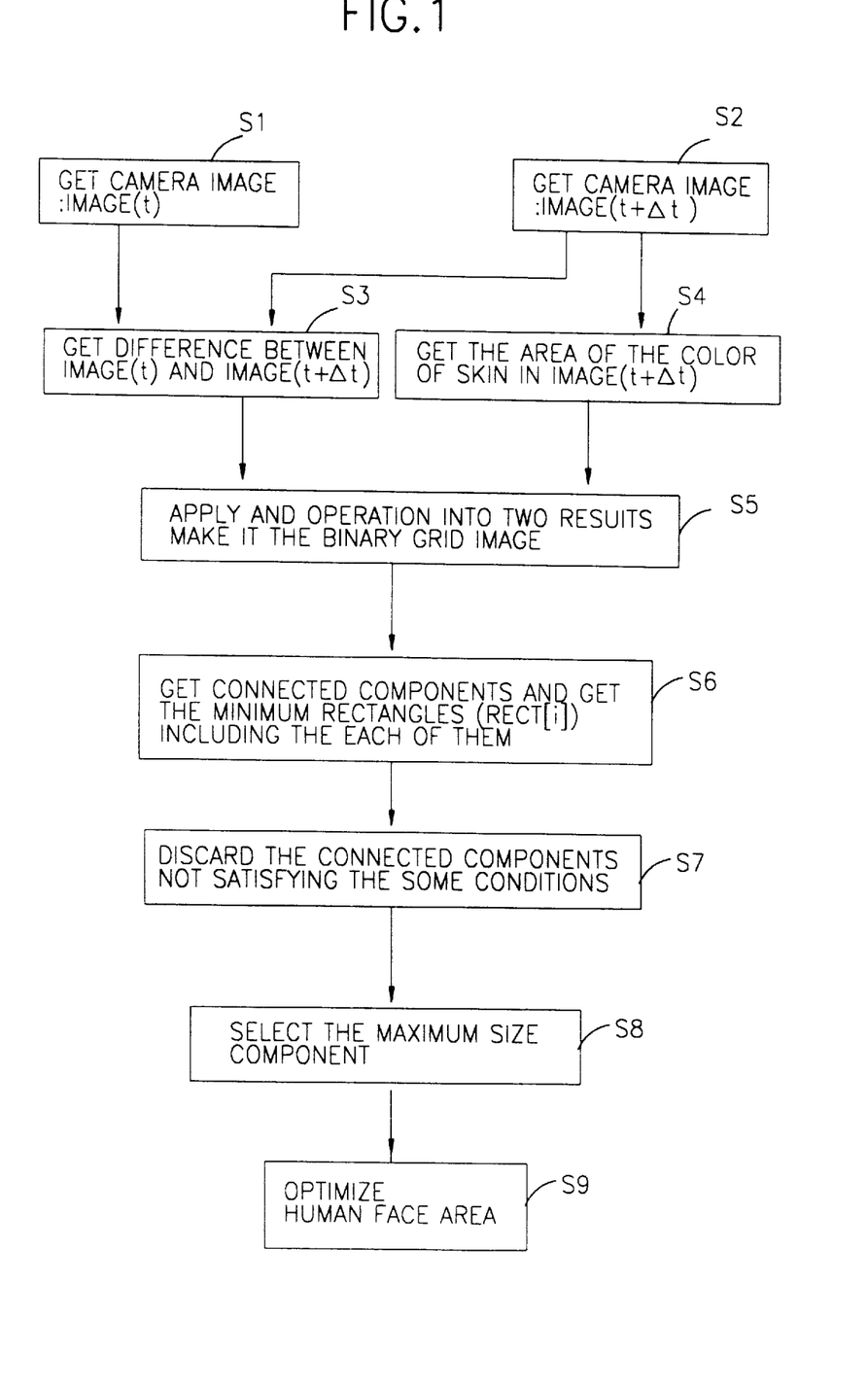
FIG. 1 is a flowchart which illustrates an object extracting method using a motion picture according to the present invention.

FIG. 1 is a flowchart which illustrates the object extracting method using a motion picture according to the present invention. In a first step (S1), a first still image frame IMAGE (t) is obtained at a time (t) from a motion picture. After a predetermined time ($\Delta t$) elapses from the time (t), a second still image frame IMAGE(t+$\Delta t$) is obtained in a second step (S2). In a third step (S3), a difference image frame which has information with respect to motion changes of an object is obtained from the first still image frame IMAGE(t) and the second still image frame IMAGE(t+Δt).

While, in a fourth step (S4) a color image frame which satisfies color information with respect to the object is obtained from the second still image frame IMAGE(t+Δt). Here, the color image frame can be obtained from the first still image frame IMAGE(t). The color image frame which has been obtained from the first still image frame IMAGE(t) or the second still image frame IMAGE(t+Δt) outputs an identical result in the object extracting method according to the present invention.

In a fifth step (S5) the color image frame and the difference image frame are ANDed, thus generating a logic image frame which has the color information and the motion change information of the object and then a grid image frame is generated by performing a grid process with respect to the logic image frame. Here, the grid process for the logic image frame reduces operation capacity and time compared with which the logic image frame is processed by the pixel. Specifically, the grid process divides the logic image frame into multiple grids, each has a fixed size, and compares a predetermined value with a value representing pixels of the grid, and expresses a value of the grid which is larger than the predetermined value as a binary grid image, thereby reducing the operation capacity and time to process the logic image frame.

However, because each grid indicates a part of the object, the grids which are gathered may have a shape similar to the object. Thus, in a sixth step (S6) using direction connection information it is determined whether the grids are connected with other grids, and if connected, the grids are defined as a connected component and thus the logic image frame includes a plurality of connected components. In addition, in the sixth step (S6), minimum rectangles each includes each of the connected components are obtained. Here, the minimum rectangles are defined as a variable RECT[i] wherein i is an integer number indicates a number of minimum rectangles. The minimum rectangle represents a candidate of a specific object to be extracted.

In a seventh step (S7), only each of the minimum rectangles, the candidates of the specific object and minimum rectangles satisfying conditions for the specific object. Here, the conditions which define the object are as follows.

(1) A size of a variable RECT[i]>a threshold value of a size of the minimum rectangle
(2) A minimum value of a row/column ratio of the variable RECT[i]<the row/column ratio of the variable RECT[i]<a maximum value of the row/column ratio of the variable RECT[i]
(3) A density of the variable RECT[i]<a threshold value of a density. Here, the threshold value of the size of the minimum rectangle and the minimum and maximum values of the row/column ratio of the variable RECT[i] are well known in the relevant field of the present invention, and in the variable RECT[i] of a minimum rectangle which includes connected components the density is a value of which the number of grids in a row or a column of one of the connected components is divided by a length of the row or the column thereof. While, the density of the variable RECT[i] is a value of which the density of the connected components is divided by an area size of the variable RECT[i].

In an eighth step (S8), among the minimum rectangles the minimum rectangle having the maximum size is selected.

Finally, in a ninth step (S9), the maximum sized rectangle is optimized to correspond to the object. In addition, if an image considerably has noise, the ninth step may be performed first before the eighth step is carried out.

Figure 2:
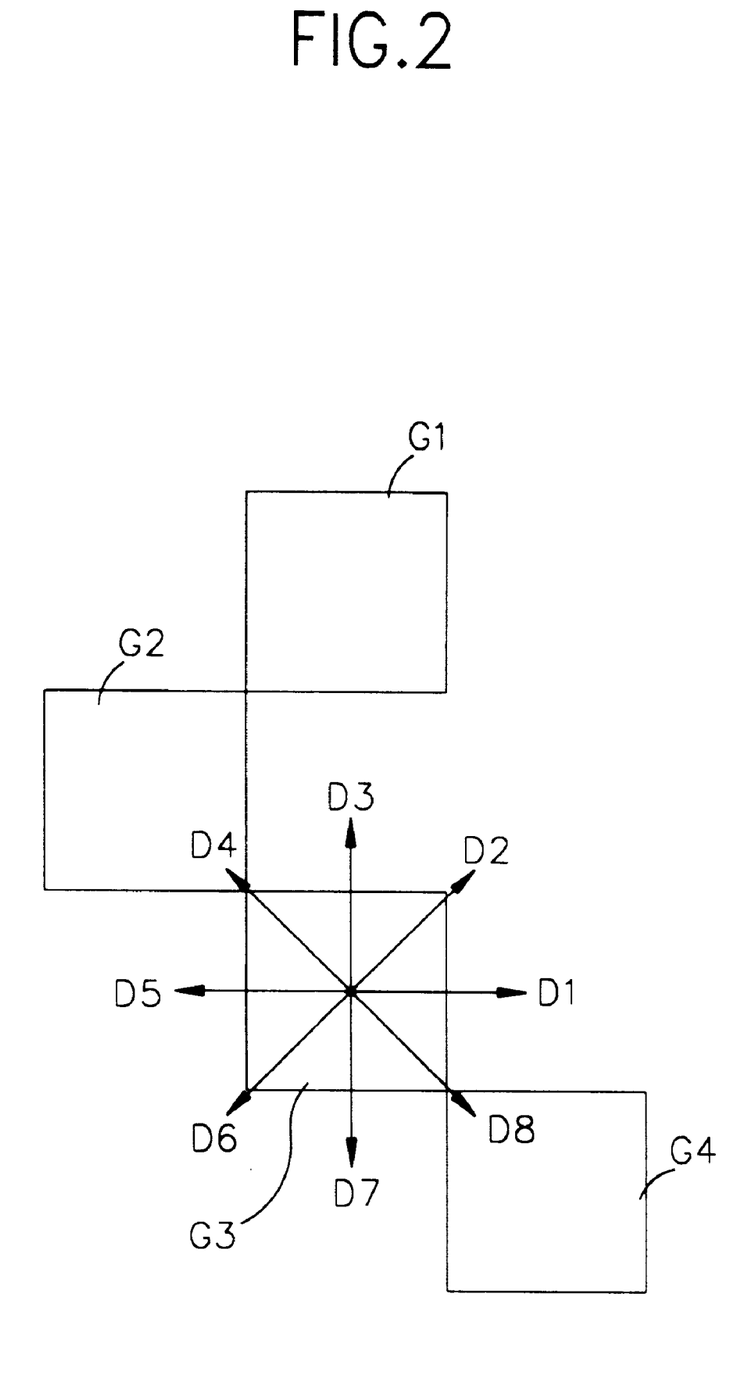
FIG. 2 is a diagram illustrating an example of a connected component which is generated in accordance with 8-direction connection information.

FIG. 2 is a diagram which illustrates an example of a connected component which is generated in accordance with 8-direction connection information, which explains the sixth step (S6) of FIG. 1.

When each of G1, G2, G3 and G4 represents a grid and D1, D2, . . . , D8 respectively indicate 8 directions, direction connection information show a condition in which a grid is connected with other grids in accordance with 4 directions or 8 directions thereof. That is, a grid G3 is connected with a grid G2 in the direction of D4 and connected with a grid G4 in the direction of D8. Accordingly, the grids G3, G2, G4 constitute a connected component. Similarly, when each connection condition is detected with respect to the grids G1, G2, G4, the grids G1, G2, G3, G4 constitute another connected component.

Now, a face extracting method which applies the object extracting method using the motion picture according to the present invention will be explained.

Figure 3A:
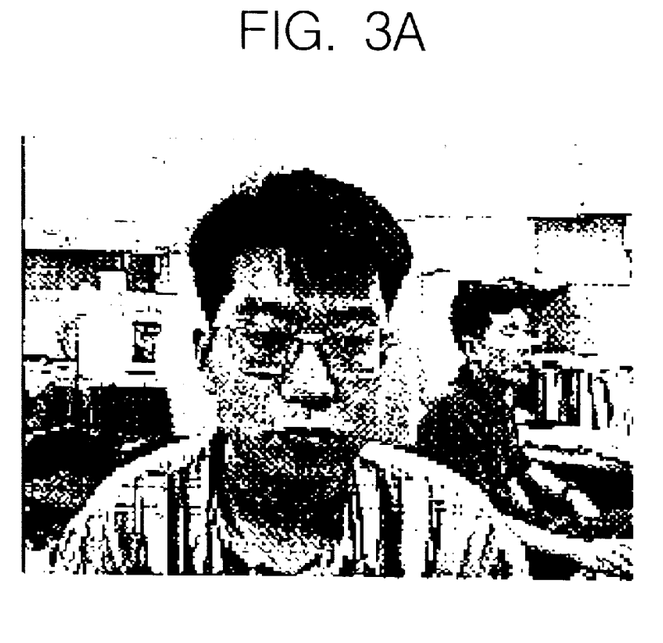
FIG. 3A is a picture which illustrates a first still image frame obtained from a motion picture.
Figure 3B:
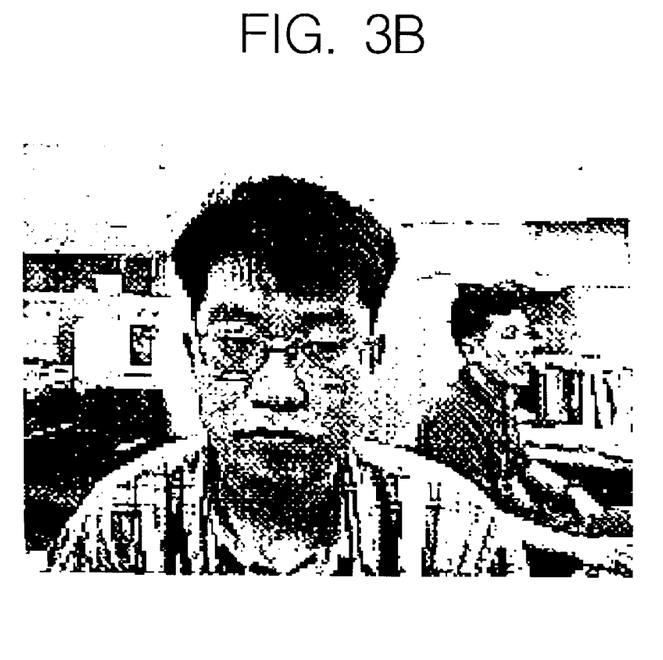
FIG. 3B is a picture which illustrates a second still image frame obtained from a motion picture after a predetermined time elapses from the time at which the first still image frame is obtained.

FIGS. 3A and 3B illustrate a pair of still image frames having a predetermined time interval, wherein FIG. 3A is a first still image frame IMAGE(t) at a time (t) and FIG. 3B is a second still image frame IMAGE(t+Δt) after a predetermined time (Δt) elapses from the time (t).

First, in order to find the motion change of the face in accordance with the time change, a difference value between the first still image frame IMAGE(t) and the second still image frame IMAGE(t+Δt) is obtained by each pixel and the resultant values thereof are compared with the threshold value which has been previously defined. Accordingly, when the resultant values are greater than the threshold value, a difference image frame can be obtained as shown in FIG. 4.

Figure 5:
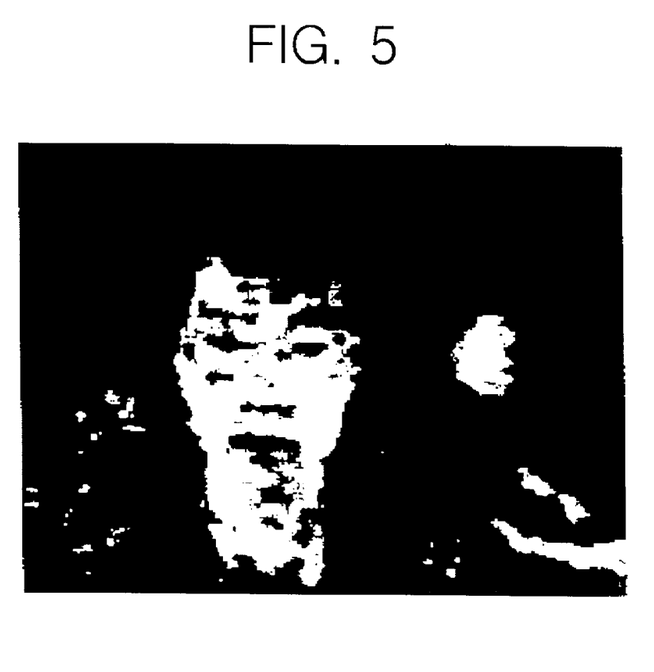
FIG. 5 illustrates a skin color image frame obtained from the second still image frame of FIG. 3B.
Figure 6:
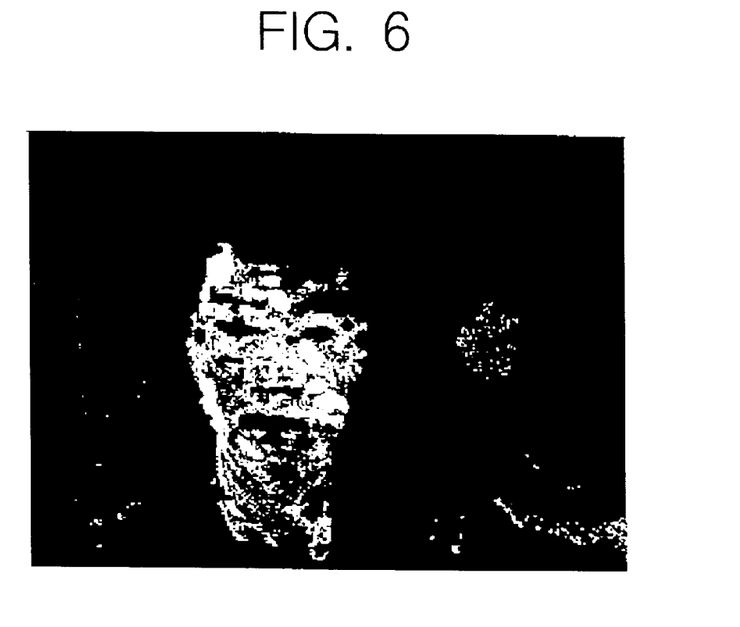
FIG. 6 illustrates a logic image frame which is obtained by ANDing the difference image frame of FIG. 4 and the skin color image frame of FIG. 5.

On the other hand, FIG. 5 illustrates a skin color image frame obtained from the second still image frame IMAGE(t+Δt) of FIG. 3B. As described above, the skin color image frame may be obtained from the first still image frame, and although the skin color image frame obtained from the first still image frame is applied to the object extracting method according to the present invention, the result is the same as a result of the skin color image frame obtained from the second still image frame.

Figure 4:
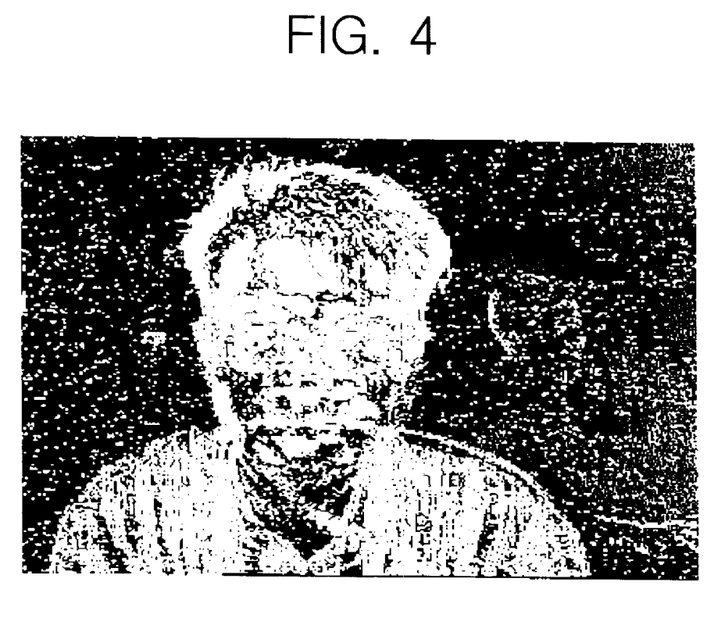
FIG. 4 illustrates a difference image frame using the first still image frame and the second still image frame in FIGS. 3A and 3B.
Figure 7:
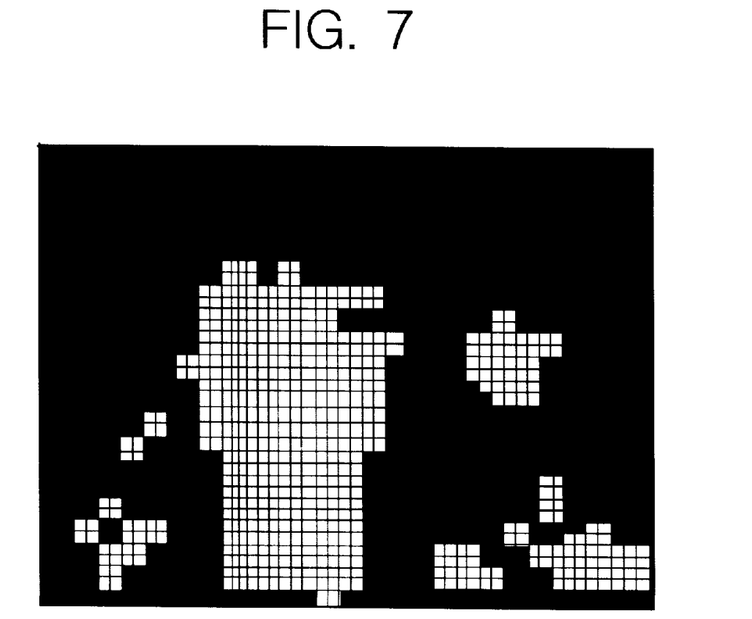
FIG. 7 illustrates a grid image frame obtained by which a grid process is applied to the logic image frame of FIG. 6.

According to the object extracting method of the present invention, a logic image frame can be obtained by ANDing the difference image frame of FIG. 4 and the skin color image frame of FIG. 5 and the logic image frame includes the motion change information and the skin color information of the face. Here, since the logic image frame is composed of pixel units, numerous computation processes are required to extract a shape of the face. Thus, the grid process is applied to obtain a grid image frame as shown in FIG. 7. Here, when the 8-direction connection information is applied to the grid image frame composed of grids which are dispersed therein, a connected component corresponding to an area of the face can be generated.

Figure 8:
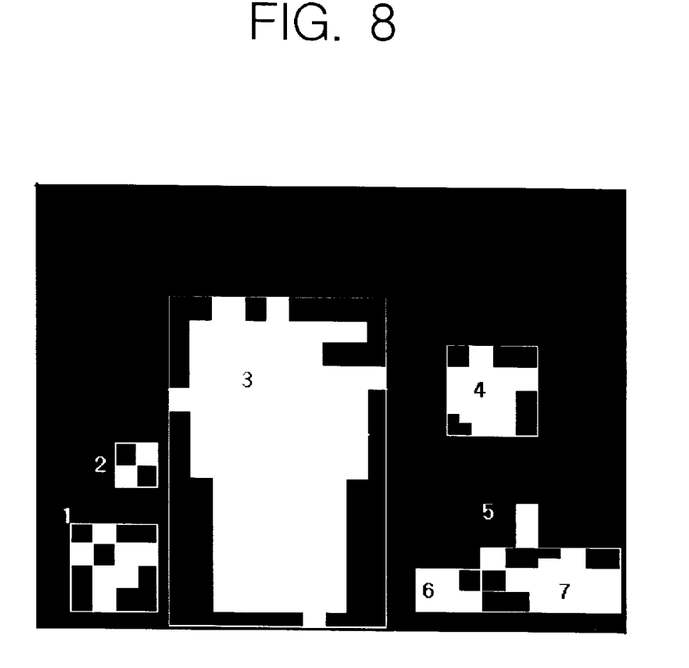
FIG. 8 illustrates minimum rectangles each includes a connected component.
Figure 9:
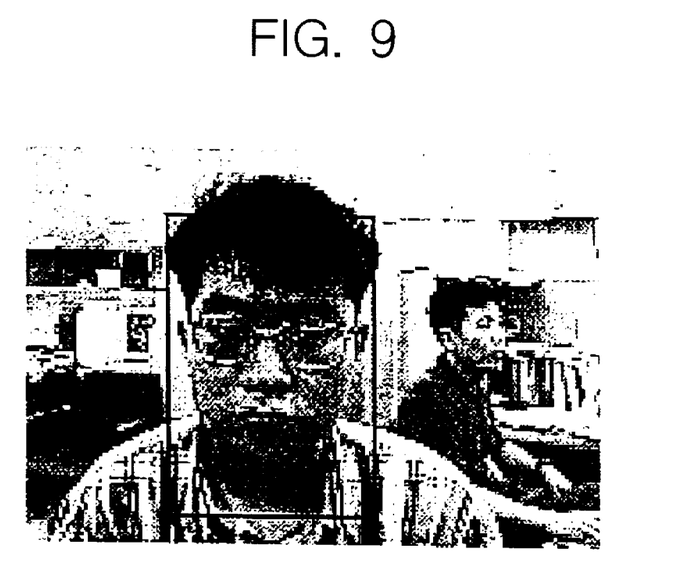
FIG. 9 is a picture which illustrates a human face extracted from a specific object in a motion picture according to the present invention.

In FIG. 7, there are seven connected components, and FIG. 8 illustrates seven rectangles each defines a minimum area which includes each of the connected components. Here, when the minimum area is expressed as a variable RECT[i] wherein i indicates a number of minimum areas, the minimum areas are RECT[1], RECT[2], . . . , RECT[7]. Thus, the conditions of the specific object are compared with each of the minimum areas and the minimum area which satisfies the conditions thereof can be obtained.

For instance, the variable RECT[3] of the minimum area is compared with the conditions of the object as follows.

(1) A size of the RECT[3]>a threshold value of a size of the minimum area (2) A minimum value of a row/column ratio of the RECT[3]<the row/column ratio of the RECT[3]<a maximum value of the row/column ratio of the RECT[3]

(3) A density of the RECT[3]<a threshold value of a density.

Here, the threshold value of the size of the face, and the minimum value and the maximum value of the row/column ratio of the variable RECT[3] are the values which are respectively defined in accordance with the object. While, the density of the variable RECT[3] is a value of which the density of the connected components is divided by the area of the variable RECT[3].

When the above-described method is applied to all of the seven minimum areas, there are remained several minimum areas which will be face area candidates (not shown).

The minimum area RECT[3] which has the largest size among the remaining minimum areas is selected as the face area. In the variable RECT[3] of a minimum rectangle which includes connected components the density indicates a value of which the number of grids in a row or a column of one of the connected components is divided by a length of the row or the column thereof. Since, the minimum area RECT[3] is a rectangle, each row or column of the minimum area obtains its density and each density is compared with a threshold value of the density and the row or column of which density is smaller than the defined threshold value is deleted, thereby optimizing the minimum area to become the shape of the face.

As described above, the object extracting method using the motion picture according to the present invention rapidly and accurately extracts the particular object using the information of the motion change of the object in the motion picture and the color information which define the color of the object.

Although the human face is taken as the present invention, the object extracting method of the present invention can be applied to any object which has change of its motion and color information thereof, if the color information thereof is differently defined. Further, if there are a plurality of objects to be extracted in the motion picture, an object which is nearest to a camera, that is the object which has a largest size thereamong, is determined as a specific object. However, when using a templete or a neural network, the specific object can be accurately and rapidly extracted even though there are a plurality of objects in a motion picture.

It will be apparent to those skilled in the art that various modifications and variations can be made in the object extracting method using the motion picture of the present invention without departing from the spirit or scope of the invention. Thus, it is intended that the present invention cover the modifications and variations of this invention provided they come within the scope of the appended claims and their equivalents.

What is claimed is:

1. An object extracting method using a motion picture, said method comprising:

obtaining a difference image frame by getting a pair of still image frames separated by a predetermined time interval from a motion picture and obtaining a color image frame which satisfies color information defining a color of a particular object from one of the still image frames;

performing a grid processing of a logic image frame, which is obtained from the difference image frame and the color image frame, at a predetermined grid size and obtaining connected components using direction connection information of the processed grids and defining minimum areas that each includes one of the connected components;

comparing each of the minimum areas with predetermined conditions, thereby selecting the minimum areas which satisfy the conditions as object area candidates; and extracting an object by selecting and optimizing an object area candidate which has a prescribed size among the object area candidates, wherein predetermined conditions are one of the following:

(1) a size of a variable RECT[i]>a threshold value of a size of the minimum area;

(2) a minimum value<the row/column ratio of the variable RECT[i]<a maximum value; and (3) a density of the variable RECT[i]<a threshold value of a density, wherein the threshold value of the size of the minimum area, the minimum value and the maximum value of the row/column ratio of the variable RECT[i] are previously defined values in accordance with the object, and the density of the variable RECT[i] is a value of which the density of the connected grid components is divided by an area size of the variable RECT[i].

2. The method of claim 1, wherein the predetermined time interval is a time that motion change of the particular object can be detected in the motion picture.

3. The method of claim 1, wherein the difference image frame only represents an area where there is the motion change of the particular object between the two still image frames.

4. The method of claim 1, wherein the particular object is a human face.

5. The method of claim 1, wherein the color information is a color which a user arbitrarily defines by adjusting color condition of the object in specific color space.

6. The method of claim 1, wherein the color information represents a skin color.

7. The method of claim 1, wherein the color image frame is defined by RGB.

8. The method of claim 1, wherein the color image frame is obtained from one of the still image frames.

9. The method of claim 1, wherein the logic image frame is obtained by ANDing the difference image frame and the color image frame.

10. The method of claim 1, wherein the direction connection information indicates a connection state of a grid to other grids with respect to eight directions.

11. The method of claim 1, wherein each of the connected components is composed of grids which are gathered according to the direction connection information.

12. The method of claim 1, wherein the minimum area is a rectangle which includes the connected components.

13. The method of claim 1, wherein the prescribed size is a largest size among the object area candidates, and wherein the largest object candidate area is located nearest to a camera.

14. The method of claim 1, wherein in the optimizing the selected object area candidate, each row or each column of the object area candidate obtains its density and each density is compared with the defined threshold value of the density and the row or column of which density is smaller than the threshold value is deleted.

15. The method of claim 14, wherein the density is in the minimum area variable RECT[i] which includes the connected components the density is a value of which the number of grids in a row or a column of one of the connected components is divided by a length of the row or the column thereof.

16. The method of claim 1, wherein the extracting the object comprises optimizing each of the object area candidates and selecting the largest area candidate thereamong.

17. The method of claim 1, wherein the predetermined conditions are not based on pixel color.

18. The method of claim 1, wherein the grid processing divides the logic image frame into a plurality of fixed size grids and compares a value representing pixels of each grid to a prescribed value to express said each grid that is larger than the prescribed value as a binary grid image.

19. An object extracting method using a motion picture, said method comprising:

obtaining a difference image frame representing motion changes of a motion picture by getting a pair of still image frames separated by a predetermined time interval from the motion picture;

obtaining a color image frame that satisfies color information defining a color of a particular object from one of the still image frames;

obtaining a logic image frame from a comparison of the difference image frame and the color image frame;

performing a grid processing of the logic image frame to determine grids of a predetermined grid size and obtaining a plurality of connected grid components using direction connection information of the grids and defining minimum areas that each includes one of the connected grid components;

comparing each of the minimum areas with predetermined conditions, thereby selecting the minimum areas that satisfy the predetermined conditions as object area candidates; and extracting an object by selecting and optimizing an object area candidate which has a prescribed size among the object area candidates, wherein predetermined conditions are one of the following:

(1) a size of a variable RECT[i]>a threshold value of a size of the minimum area;

(2) a minimum value<the row/column ratio of the variable RECT[i]<a maximum value; and (3) a density of the variable RECT[i]<a threshold value of a density, wherein the threshold value of the size of the minimum area, the minimum value and the maximum value of the row/column ratio of the variable RECT[i] are previously defined values in accordance with the object, and the density of the variable RECT[i] is a value of which the density of the connected grid components is divided by an area size of the variable RECT[i] wherein minimum area is a rectangle which includes the connected components.

20. An object extracting method using a motion picture, said method comprising:

obtaining a difference image frame by getting a pair of still image frames separated by a predetermined time interval from a motion picture and obtaining a color image frame which satisfies color information defining a color of a particular object from one of the still image frames;

performing a grid processing of a logic image frame, which is obtained from the difference image frame and the color image frame, at a predetermined grid size and obtaining connected components using direction connection information of the processed grids and defining minimum areas that each includes one of the connected components;

comparing each of the minimum areas with predetermined conditions, thereby selecting the minimum areas which satisfy the conditions as object area candidates; and extracting an object by selecting and optimizing an object area candidate which has a prescribed size among the object area candidates, wherein in the optimizing the selected object area candidate, each row or each column of the object area candidate obtains its density and each density is compared with the defined threshold value of the density and the row or column of which density is smaller than the threshold value is deleted.

* * * * *